United States Patent
Childs et al.

Patent Number: 5,623,545
Date of Patent: Apr. 22, 1997

[54] AUTOMATIC DATA GENERATION FOR SELF-TEST OF CRYPTOGRAPHIC HASH ALGORITHMS IN PERSONAL SECURITY DEVICES

[75] Inventors: Matthew H. Childs; Thomas M. Norcross, both of Arlington, Tex.

[73] Assignee: National Semiconductor Corporation, Santa Clara, Calif.

[21] Appl. No.: 521,794

[22] Filed: Aug. 31, 1995

[51] Int. Cl.$^6$ ................... H04K 1/00; H04L 9/28
[52] U.S. Cl. ................... 380/2; 380/28; 380/46; 380/49; 331/78; 364/717; 324/73.1
[58] Field of Search ................... 380/2, 9, 28, 46, 380/49, 59; 364/717; 331/78; 324/73.1

[56] References Cited

U.S. PATENT DOCUMENTS

4,680,539   7/1987   Tsai ........................... 324/73.1

*Primary Examiner*—Bernarr E. Gregory
*Attorney, Agent, or Firm*—Limbach & Limbach L.L.P.

[57] ABSTRACT

According to the present invention, the solution includes the hardware hash algorithm block to automatically generate data to hash from its initialization values and to run unassisted instead of needing a continuous supply of additional input data. This approach according to the present invention solves the above shortcomings of related solutions by eliminating the need to continuously feed input data to be hashed to obtain a high fault coverage. This reduces the sizes of the firmware and test vectors necessary to test the hardware. Also, since the hardware autonomously generates new data to hash, other hardware modules can be tested in parallel. This reduces the overall test time and cost. To remove the requirement of inputting multiple fixed length sub-blocks, additional sub-blocks are created from the initial sub-block using a hardware expansion function, and the hardware continues to run unattended for some predetermined number of sub-blocks. The hash hardware can use the expansion function, $W[i]=W[i-3]$ xor $W[i-8]$ xor $W[i-14]$ xor $W[i-16]$, to expand existing data into new data, where $W[i-x]$ originates from the initial sub-block. By utilizing the non-linear xor function, $W[i]$ will be random data if any of $W[i-3]$, $W[i-8]$, $W[i-14]$, or $W[i-16]$ are random. This expansion function is good for achieving high fault coverage because the new W values will likely be different from the other W values that have been hashed. This expansion function is convenient to use because it is utilized by the Secure Hash Algorithm as specified by the Secure Hash Standard FIPS PUB 180 and FIPS PUB 180-1 (includes a left rotate by one bit position).

21 Claims, 9 Drawing Sheets

AUTOMATIC DATA GENERATION FOR SELF-TEST OF CRYPTOGRAPHIC HASH ALGORITHMS IN PERSONAL SECURITY DEVICES

BACKGROUND OF THE INVENTION

1. Field of the Invention

The present invention relates to the field of testing cryptographic hardware. Specifically, the present invention relates to achieving high fault coverage of a hardware hash function using an expansion function to automatically generate new hash test data from existing machine state.

2. Discussion of the Related Art

The Secure Hash Algorithm takes as input a variable number of 512-bit message blocks MB(i). If the message is not an exact multiple of 512-bits in length, the message is padded so that it is a multiple of 512 bits long. Padding is performed by appending a 1 and then as many zeros as are necessary to become 64 bits short of a multiple of 12. Finally, a 64-bit representation of prepadding length of the message is appended to the end. Thus, the padded message is one or more 512-bit message blocks, the first being MB(0), MB(1), ... MB(i), etc. The Secure Hash Algorithm starts with five 32-bit variables, which are initialized as follows.

A=H0=0x67452301
B=H1=0xEFCDAB89
C=H2=0x98BADCFE
D=H3=0x10325476
E=H4=0xC3D2E1F0

The 512-bit message block is then expanded from sixteen 32-bit words (M0 to M15) to eighty 32-bit words (W0 through W79) using the following expansion function, in which t is the operation number from 0 to 79, and Mi represents the ith word:

$W_t = M_t$ for t=0 to 15

$W_t = W_{t-3}$ XOR $W_{t-8}$ XOR $W_{t-14}$ XOR $W_{t-16}$ for t=16 to 79

The main loop of the Secure Hash Algorithm process then begins and is executed as follows, for t=0 through 79.

Accumulator=(A<<<5)+f(t,B,C,D)+E+Wt+Kt
E=D
D=C
C=(B<<<30)
B=A
A=Accumulator

In the above equations the constant Kt has four different constant values, and f(t,B,C,D) implements three logic functions during the four rounds of twenty operations as shown below.

| hash operation t | Kt = | f(t,B,C,D) = |
|---|---|---|
| t = 0–19 | 5A827999h | (B&C)\|(~B&D) |
| t = 20–39 | 6ED9EBA1h | B XOR C XOR D |
| t = 40–59 | 8F1BBCDCh | (B&C)\|(B&D)\|(C&D) |
| t = 60–79 | CA62C1D6h | B XOR C XOR D |

After the eighty rounds, A, B, D, and E are added to H0, H1, H2, H3, and H4, respectively, and the respective sums replace the previous H0, H1, H2, H3, and H4, respectively. The final output message digest is 160-bit concatenation of H0, H1, H2, H3, and H4. The Secure Hash Algorithm continues with the next message block MB(i+1) until all message blocks have been processed.

A secure hash function is a critical function in data security, electronic commerce, and privacy enhanced mail systems. To optimize security these functions are implemented with hardware on a portable security token. This environment creates implementation challenges in the efficient and thorough testing in a secure manner. The objectives are to minimize the test time required to validate cryptographic hash algorithms used in personal portable security devices and to reduce the overall die size. The problem is secure devices typically need a large set of test vectors to provide the necessary fault coverage because normal test procedures such as scan or taking internal signals to pins can not be used because of a lack of security inherent in these procedures.

The related solutions were to increase chip size to facilitate the extra firmware and data storage necessary to test the hash algorithm. In manufacturing tests, the hash block was tested in a serial fashion with other hardware modules. The shortcomings are larger die size and longer test time which results in higher development costs.

Figure 1:
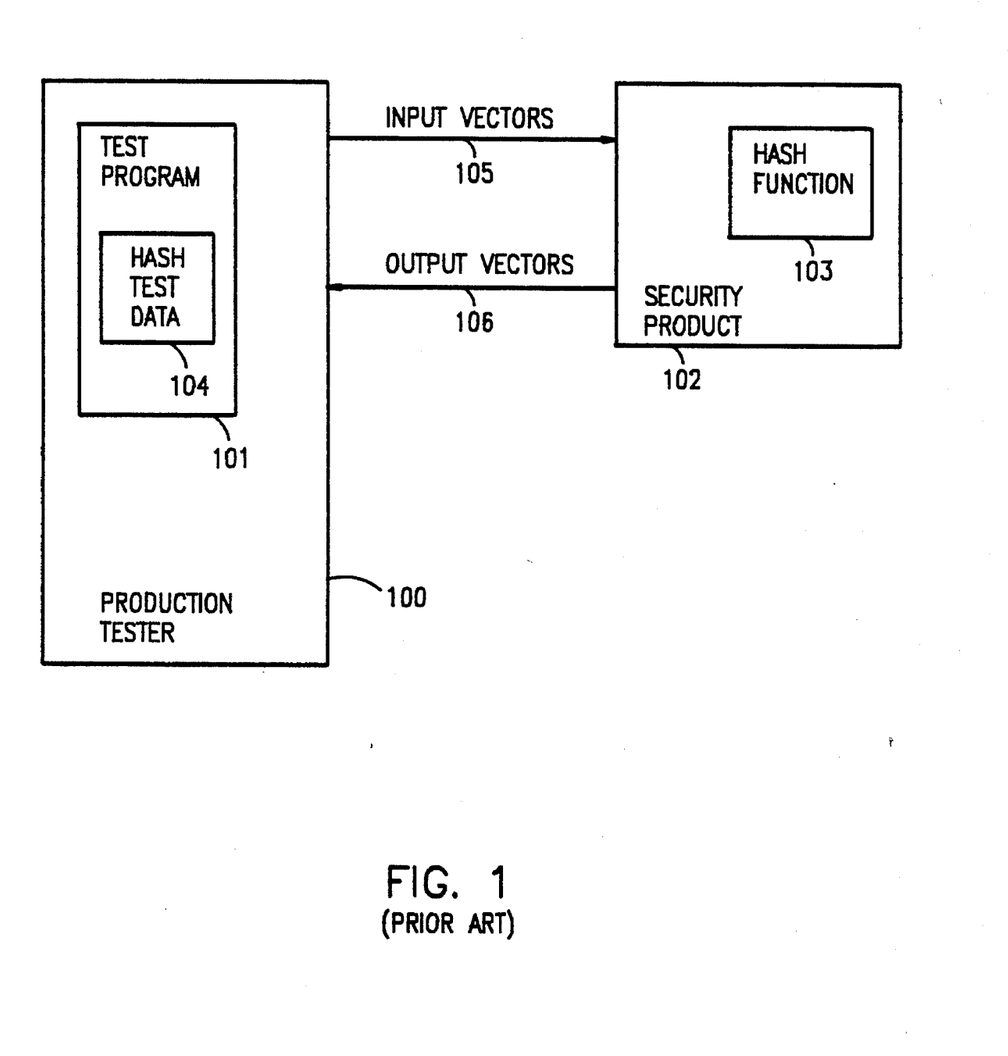
FIG. 1 illustrates a conventional production test environment for a security product having a hash function.

Referring to FIG. 1, the field of one aspect of the present invention involves a production tester 100 performing testing on a cryptographic system (product) 102. The cryptographic system 102 is either a single integrated circuit or a system including several integrated circuits. The product 102 under test includes at least a hash function implementation 103. The hash function implementation 103 is either hardware-based, software-based, or some combination of software with special hardware support. The production tester 100 includes a pattern generating portion that produces input test vectors 105 to input to the product 102. The production tester 100 also includes a logic analyzer section for receiving output test vectors 106 from the product 102. The production tester 100 will typically run a test program 101 which includes selected values for the input test vectors 105 and the expected correct output test vectors 106 for any specific product 102. The input test vectors 105 are typically chosen so as to fully exercise the product 102. If any part of the product 102 is flawed, the output test vectors 106 will not match the precomputed expected (correct) results stored in the test program 101, and the product 102 under test will fail production testing.

Figure 2:
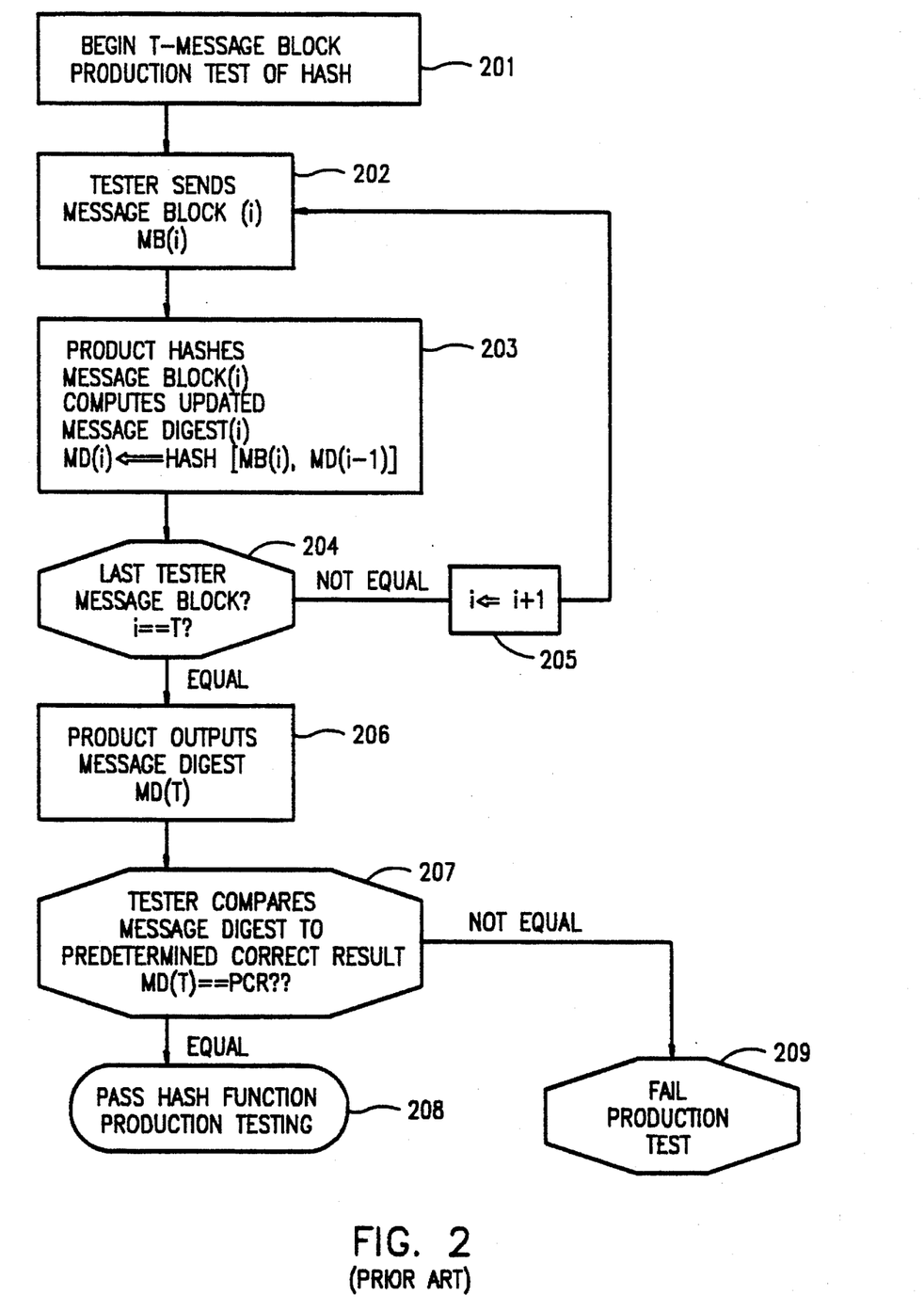
FIG. 2 illustrates a conventional method for production testing a message block.

FIG. 2 illustrates a typical testing procedure for production testing a hash implementation with T 512-bit test message blocks which are stored in the hash test data 104 as shown in FIG. 1. The production tester 100 at step 201 begins testing the hash implementation 103. At step 202, the tester 100 sends the first 512-bit test message block MB(1) as 16 serial 32-bit input vectors 105. At step 203, the product hashes the first message block using its hash implementation 103 to produce a message digest MD(1). Test 204 test whether the last test message block MB(T) has already been entered. If this is not the last test block T, test 204 in the test program 101 begins inputting the next test message block at step 202, through step 205. Step 205 illustrates proceeding to the next hash block, thereby repeating steps 202, 203, and 204 until the last test message block T has been processed, at which time test 204 in the test program 101 branches to the product outputting the final message digest MD(T) at step 206. During the hashing of each intermediate test message block MB(i), step 203 illustrates that each intermediate message digest MD(i) is a function of the current message block MB(i) and the previous message digest MD(i−1). Then the test program, at step 207, compares the output message digest MD(T) to the precomputed correct result PCR stored in the test program 101. If the two are equal, the product 102 passes the production hash implementation testing 208. If the two are different, the product 102 fails production testing.

There are a very large number of input permutations possible in the hash implementation. Because it is desirable to fully test the hardware hash circuitry, T is usually made to be very large. Assuming that the portion of circuitry tested during a particular hash cycle i is a random P fraction of the total hardware, then the total test coverage F fraction of the total hardware is $1-(1-P)^T$. This means that in order to achieve a high fault coverage, the number of test message blocks T is increased. Unfortunately, however, the T test message blocks MB(1) through MB(T) are stored in the test program 101 as hash test data 104. If since P is a low number, T must be large to achieve high fault coverage, and all this test data 104 is stored in the test program 101. It is undesirable to maintain a large amount of test data 104 in the test program 101. Even if a program were written which would generate test data without requiring large data storage, it would be undesirable to occupy the input vector lines for a lengthy hash test, since this would forestall further tests which must be performed on the other parts of the product 102. Thus the total test time increases since the hash function test must occur serially with the other tests.

SUMMARY OF THE INVENTION

According to the present invention, the solution includes the hardware hash algorithm block to automatically generate data to hash from its initialization values and to run unassisted instead of needing a continuous supply of additional input data.

This approach according to the present invention solves the above shortcomings of related solutions by eliminating the need to continuously feed input data to be hashed to obtain a high fault coverage. This reduces the sizes of the firmware and test vectors necessary to test the hardware. Also, since the hardware autonomously generates new data to hash, other hardware modules can be tested in parallel. This reduces the overall test time and cost.

In general, hash functions reduce a variable length of data into a fixed length representation. Many cryptographic hash functions divide the input data into small fixed length sub-blocks and process one sub-block at a time. Once one sub-block has been processed the next sub-block is input and processed. This continues until the entire input block has been hashed to produce the final fixed length output block, also known as the message digest. To remove the requirement of inputting multiple fixed length sub-blocks, additional sub-blocks can be created from the initial sub-block by using a hardware expansion function, and the hardware continues to run unattended for some predetermined number of sub-locks. The hash hardware can use the expansion function, $W[i]=W[i-3]$ xor $W[i-8]$ xor $W[i-14]$ xor $W[i-16]$, to expand existing data into new data, where $W[i-x]$ originates from the initial sub-block. By utilizing the non-linear xor function, $W[i]$ will be random data if any of $W[i-3]$, $W[i-8]$, $W[i-14]$, or $W[i-16]$ are random. This expansion function is good for achieving high fault coverage because the new W values will likely be different from the other W values that have been hashed. This expansion function is convenient to use because it is utilized by the Secure Hash Algorithm as specified by the Secure Hash Standard FIPS PUB 180 and FIPS PUB 180-1 (includes a left rotate by one bit position). Therefore, there is no substantial hardware or software cost for the ability to automatically test the hardware hash implementation according to the present invention.

The approach has great commercial value in the data security market place. For increased security, embedded controllers contain a number of integrated cryptographic algorithms including hashes. Almost all security devices for electronic commerce utilize hash functions. Conserving ROM memory space is critical in these applications because portability is very valuable. Thus it is undesirable to maintain firmware for generating test data. Even if firmware is included to either store or generate hash test data, the internal bus is occupied during testing in order to generate and transfer the test data to the hash hardware. Furthermore, because of expected high volumes, the savings in test time, especially in known good-die environments, is extremely valuable. For example, during power on self testing, the product has already passed the initial production testing, and it is undesirable to wait for a lengthy hash test serially with all the other self tests. Therefore, an auto test according to the present invention can be performed with little bus intervention concurrently with other module testing or processing.

BRIEF DESCRIPTION OF THE DRAWINGS

The Figures are more fully explained the Detailed Description of the Invention, in which elements are labeled such that the hundreds decimal position indicates in which Figure the element appears. For example, element 605 is in FIG. 6.

DETAILED DESCRIPTION OF THE INVENTION

Figure 4:
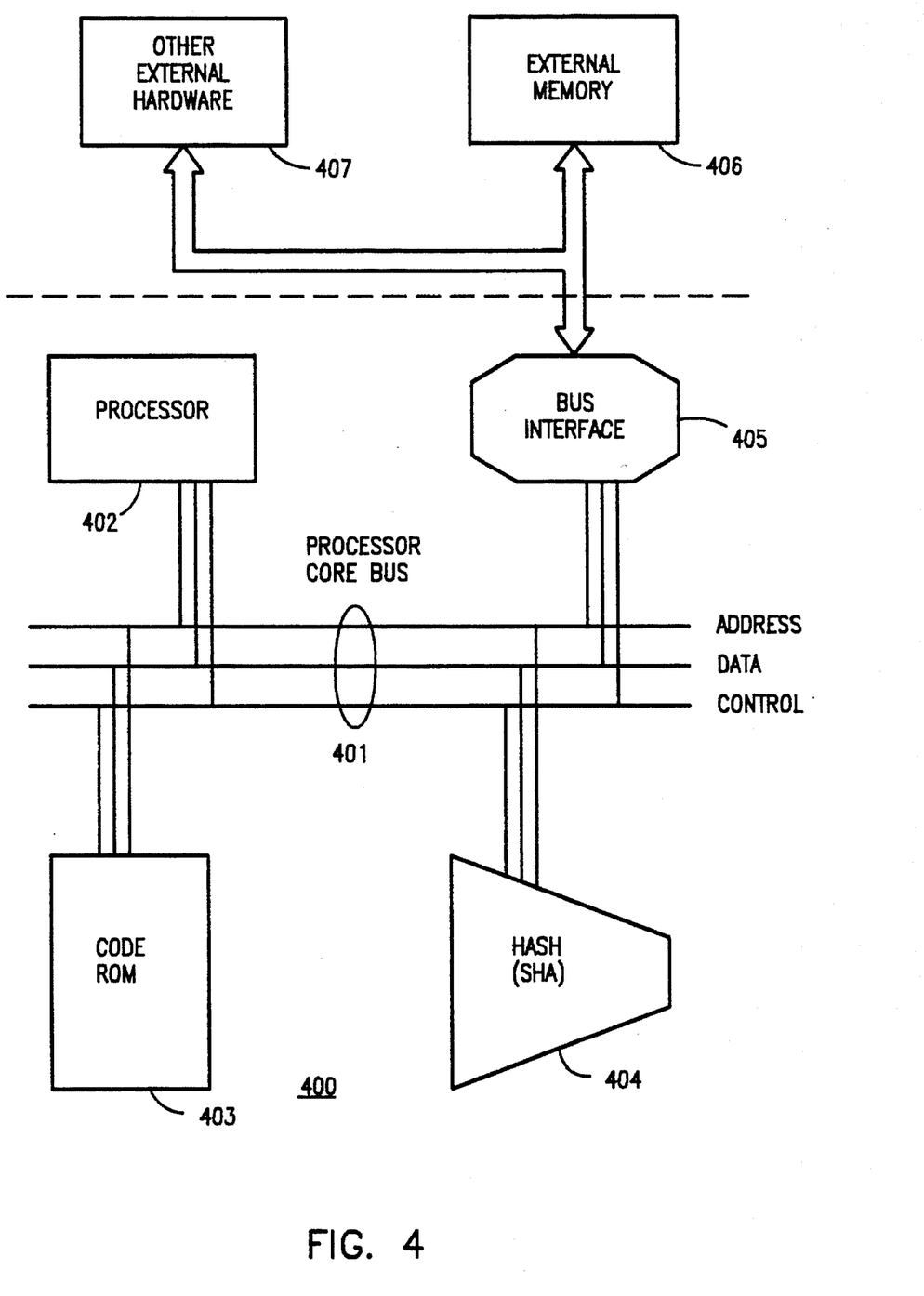
FIG. 4 illustrates a typical chip level architecture for a product having a hardware hash function implementation according to the present invention.

According to the present invention, the solution is for the hardware hash algorithm block 404 to automatically generate data to hash from its initialization values and to run unassisted instead of needing a continuous supply of additional input data.

This approach according to the present invention solves the above shortcomings of related solutions by eliminating the need to continuously feed input data to be hashed to obtain a high fault coverage. This reduces the sizes of the firmware and test vectors necessary to test the hardware. Also, since the hardware autonomously generates new data to hash, other hardware modules can be tested in parallel. This reduces the overall test time and cost.

In general, hash functions reduce a variable length of data into a fixed length representation. Many cryptographic hash functions divide the input data into small fixed length sub-blocks and process one sub-block at a time. Once one sub-block has been processed the next sub-block is input and processed. This continues until the entire input block has been hashed to produce the final fixed length output block, also known as the message digest. To remove the requirement of inputting multiple fixed length sub-blocks, additional sub-blocks can be created from the initial sub-block by using an expansion function, and the hardware continues to run unattended for some predetermined number of sub-blocks. The hash hardware can use the expansion function, $W[i]=W[i-3]$ xor $W[i-8]$ xor $W[i-14]$ xor $W[i-16]$, to expand existing data into new data, where $W[i-x]$ originates from the initial sub-block. By utilizing the non-linear xor function, $W[i]$ will be random data if any of $W[i-3]$, $W[i-8]$, $W[i-14]$, or $W[i-16]$ are random. This expansion function is good for achieving high fault coverage because the new W values will likely be different from the other W values that have been hashed. This expansion function is convenient to use because it is utilized by the Secure Hash Algorithm as specified by the Secure Hash Standard FIPS PUB 180.

The approach has great commercial value in the data security market place. For increased security, embedded controllers contain a number of integrated cryptographic algorithms including hashes. Almost all security devices for electronic commerce utilize hash functions. Conserving ROM space is critical in these applications because portability is very valuable. Also, because of expected high volumes, the savings in test time, especially in known good-die environments, is extremely valuable.

FIG. 4 illustrates a product according to the, preferred embodiment of the present invention. The cryptographic product according to the preferred embodiment of the present invention includes a RISC (Reduced Instruction Set Computing) processor 402, a code ROM 403, a hardware hash module 404, and other necessary elements (such as a bus interface 405) in a single device, as depicted in FIG. 4. The cryptographic processor interfaces with external memory through a bus interface unit 405. The cryptographic processor contains a secure kernel that provides the essential elements of an API (Application Program Interface) which in turn provides access to internal chip resources. Application code for the cryptographic circuit card resides in an off-chip memory separate from the cryptographic processor chip. This off-chip application code gains access to the cryptographic processor through the bus interface unit 405. As shown in FIG. 4, the environment for the preferred embodiment of the present invention includes a 32-bit RISC processor 402 having a RAM (Random Access Memory) (not shown) for maintaining an internal stack for saved machine state resulting from exceptions (traps and interrupts), a hardware Secure Hash Algorithm (FIPS PUB 180 and FIPS PUB 180-1) implementation 404, and a non-volatile ROM memory (Read-Only Memory) 403 for storing the secure kernel. Other hardware functions can easily be included in, or eliminated from, the processor as desired. For example, the hardware Secure Hash Algorithm implementation can be eliminated by a software implementation, where the software implementation is stored within the ROM.

Software executing out of external memory gains access to the cryptographic services of the cryptographic processor via a Supervisor Call trap instruction (EXCP SVC). Prior to invoking this instruction, the external software will load specific processor registers with a command code and other parameters for the requested service and execute the EXCP SVC instruction. The exception service routine is stored within the ROM. The processor will then save the contents the current machine state on the interrupt stack in the SRAM, read a branch address from an interrupt dispatch table in the ROM. Then control is transferred to that branch address within the ROM.

The SVC exception service routine in the ROM will verify the command code and parameters passed in the registers and branch to an appropriate command service routine within the ROM. When the command service routine has completed the requested operation, it will return to the SVC exception service routine which will restore the previous machine state from the internal stack in the SRAM, and return control to the external software. The product connects to external hardware 407 and external memory 406.

In the preferred embodiment of the present invention, the hash block 404 is the Secure Hash Algorithm Accelerator Module, which implements the main functions of the Secure Hash Algorithm as described in FIPS PUB 180, Secure Hash Standard, 1993 May 11 and FIPS PUB 180-1, Secure Hash Standard, 1994 May 31. The SHA Accelerator resides on the processor core bus. Thus, the SHA Accelerator implements the main functions of the Secure Hash Algorithm in two ways. FIGS. 5 through 9 illustrate the various portions of the hardware hash accelerator.

The SHA Accelerator provides an additional mode that is used for testing and verification. The Auto-Test Mode allows the SHA Accelerator to cycle through the SHA a programmable number of times without external assistance after an initialization process.

Figure 5:
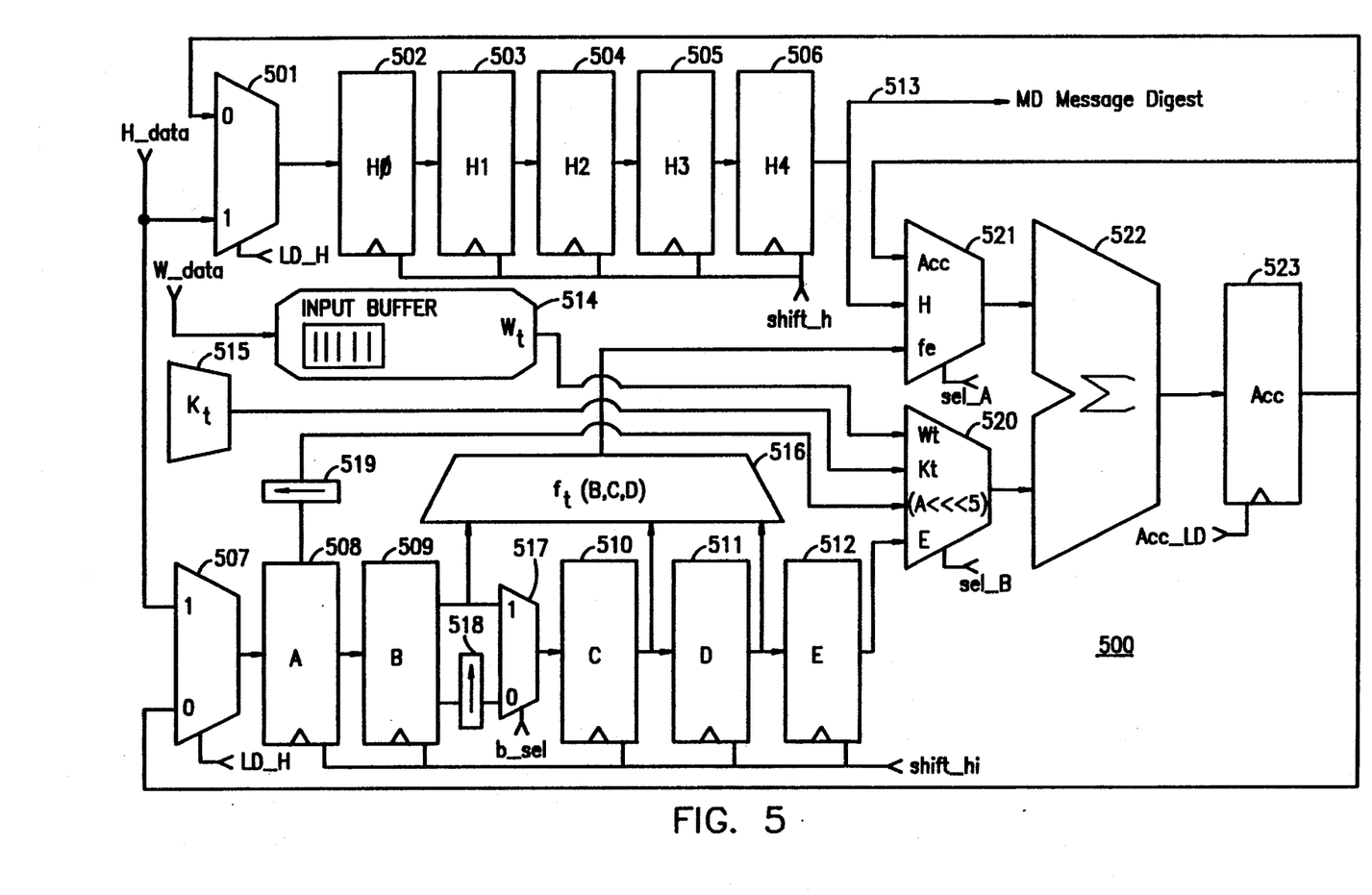
FIG. 5 illustrates the module level hardware configuration for the Secure Hash Algorithm implementation according to the preferred embodiment of the present invention.
Figure 9:
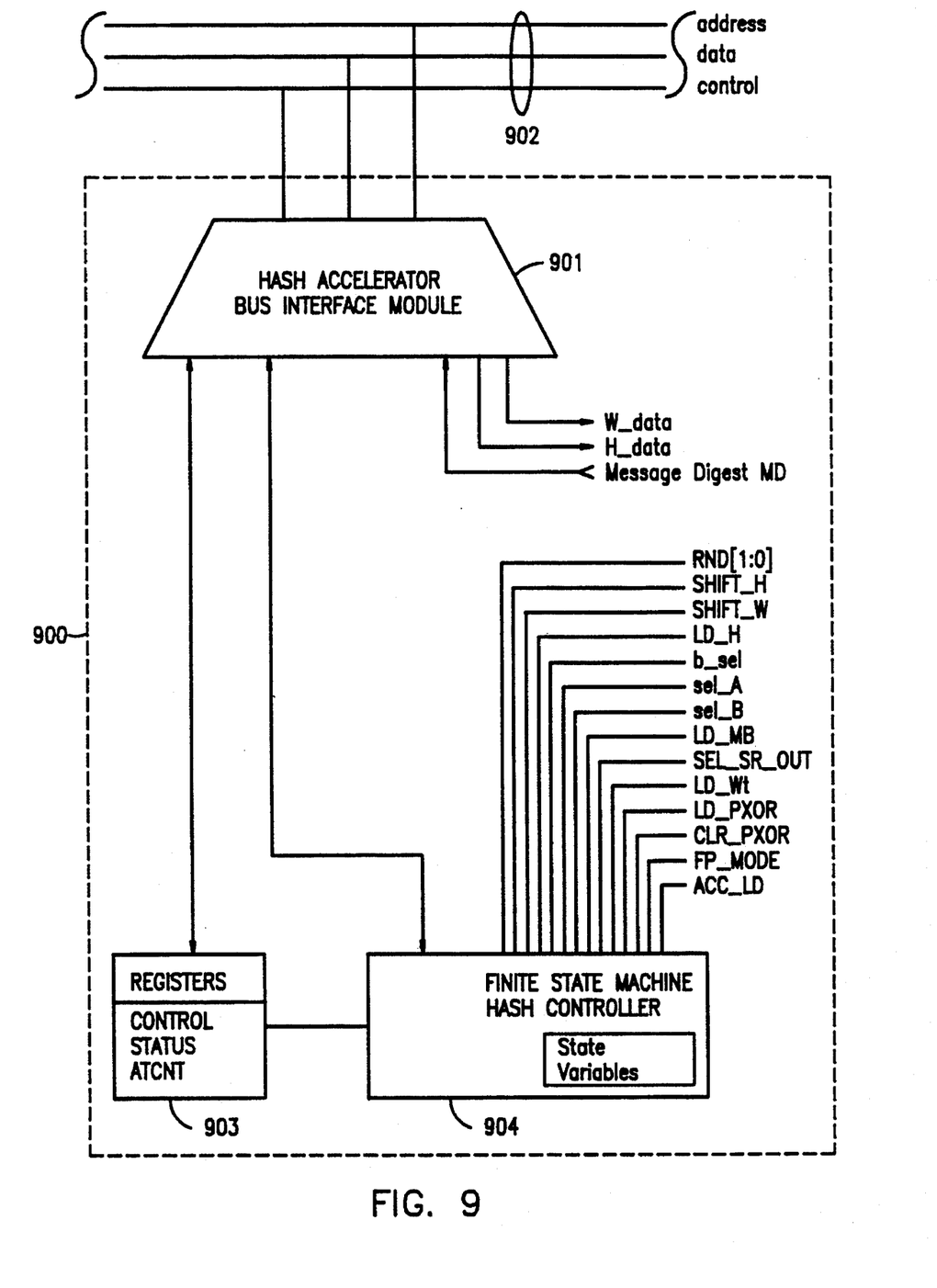
FIG. 9 illustrates the bus interface, registers, and state machine controller for the Secure Hash Algorithm implementation according to the present invention.

The SHA Accelerator relies on a bus master (for example, the processor 402 or the bus interface 405 delivering external data from external sources 407 or 406) to load initial values and data. The bus master resides on the core bus 401,902. The bus master loads the initial H values, the W values, and reads the final message digest out of H0–H4 513.

In the preferred embodiment, an external source must pad the message, if necessary to complete the 512-bit block alignment requirement. The SHA Accelerator performs all other functions of the Secure Hash Algorithm. The SHA Accelerator supports 8-bit access to all of its control and status registers and 32-bit access only to the data registers. The SHA Accelerator resides on the processor core bus. The SHA Accelerator operates with zero wait states and supports pipelined accesses.

$Sx$(variable) represents left rotation by x bits of the variable. $X \rightarrow Y$ represents X being loaded into Y. $X+Y$ represents the sum of binary numbers X and Y discarding the carry bit.

Figure 6:
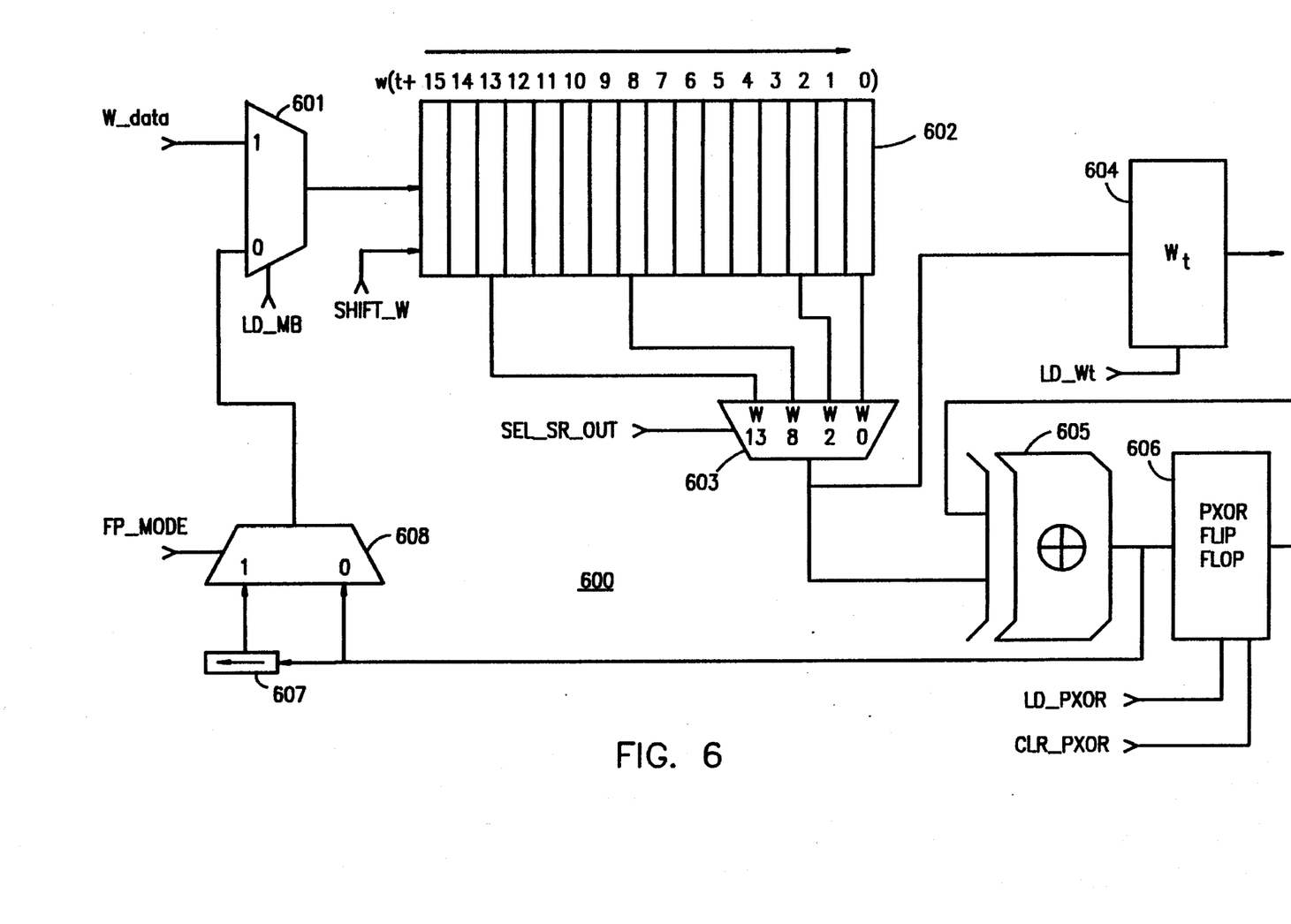
FIG. 6 illustrates the expansion function hardware of the Secure Hash Algorithm implementation according to the present invention.

The following functional overview for hashing a message with the SHA Accelerator assumes that the module is initially in the idle state. The module clears its Busy status bit when the hash hardware shown in FIG. 5 has finished hashing, and the expansion hardware shown in FIG. 6 is no longer generating future W values.

The SHA Accelerator uses a bus master to initialize the module. FIG. 9 shows the hash accelerator bus interface unit 900 which contains the control and status registers, address decoding, and a state machine controller for the SHA Accelerator Module's five clock cycle basic SHA operation. Each increment of t takes five clock cycles. The following is the initialization process of the SHA Accelerator Module.

1. Write H4, H3, H2, H1, and H0 into the H_data register. The H_data register supports 32-bit read/write cycles. The SHA Accelerator loads the A–E registers as the H values are loaded (H4→E, H2→D, H2→C, H1–B, H0→A). Therefore, the bus master must load the H values in the order H4, H3, H2, H1, H0.

The H_data register, as illustrated in FIG. 5 is really an address space which maps by decoding through a hash bus interface unit (901 in FIG. 9) of the hash implementation 404 to a multiplexor 501 which loads flip-flop H0 when H_data is written to. H0 502 feeds H1 503, which feeds H2 504, which feeds H3 505, which feeds H4 506. Similarly, H_data also decodes to input to multiplexor 507, which is controlled by the same select signal LD_H as multiplexor 501. Multiplexor 507 feeds the input to a similar shift register for the A 508, B 509, C 510, D 511, and E 512 variables.

2. Write 16 W values into the W_data register. The bus master must load the values in the following order: W0, W1, W2, ..., W14, W15.

FIG. 6 illustrates a detailed embodiment of the Wt generator 514 shown in FIG. 5. Similarly, the W_data register, as illustrated in FIG. 6, is conceptually a sixteen deep 32-bit wide shift register which is selected by LD_MB on multiplexor 601 in FIG. 6 when each message block word is written to W_data.

3. Once W15 is loaded, the SHA Accelerator automatically enters the hash state and sets the Busy status bit. Once the Busy bit is cleared, 16 new W values may be loaded. The H_data register cannot be modified while the Busy status bit is set. Once the Busy status bit is cleared, the H values may be read or written.

While in the hash state, the SHA Accelerator executes 80 loops (t=0 to 79). The SHA Accelerator generates new Wt values concurrently with loop execution. When the last W value W79 has been generated at time t=63, the expansion function hardware (605, 606, 608, 607) is no longer needed, although the shift register 602, multiplexor 603, and Wt register 604 continue to feed the remaining W values W64 through W79 presently stored in the shift register 602. The expansion function hardware (605, 606, 608, 607) is used according to the present invention to automatically generate the 16 32-bit test message block sub-blocks needed in Auto test mode.

FIG. 5 illustrates an embodiment of the Secure Hash Algorithm. Each loop increments t and requires five clock cycles. The basic computational tool used in the hardware 500 is the adder 522 and accumulator register 523. The two input adder 522 has a three input multiplexor 521 on input A and a four input multiplexor 520 on input B. The other major components of the SHA Accelerator are the Wt generator 514, the H shift registers H0–H4 502–506, the A–E shift register 508–512. Between flip flops B 509 and C 510, a multiplexor 517 selects between an output and 30 bit position left-rotated version provided by the connectivity pattern of the hardwired left rotator 518.

Figure 7:
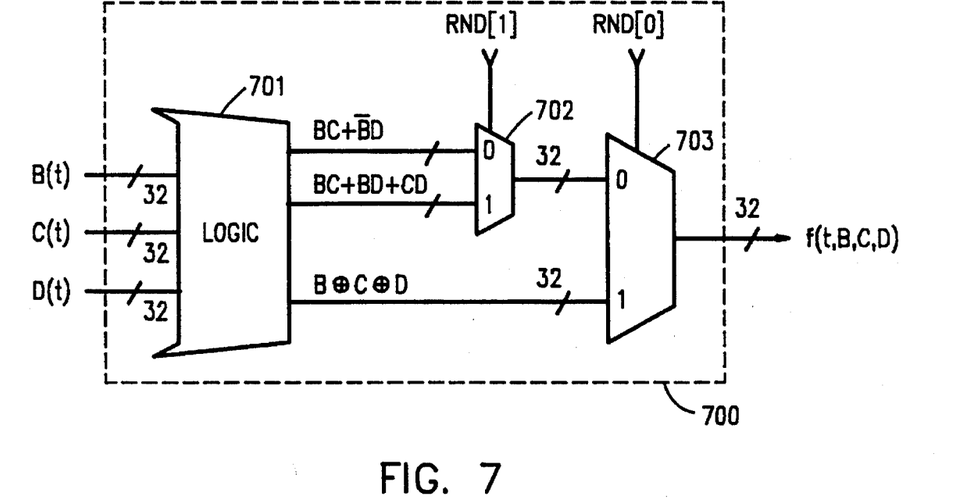
FIG. 7 illustrates one way to implement the f(t,B,C,D) function generator for the Secure Hash Algorithm implementation according to the present invention.

The f(t,B,C,D) generator 516 implements the combinational logic as illustrated for example in FIG. 7, where RND[1:0] represents the encoded value of the round number, from 0 to 3 represents the first through four rounds of twenty operations. Combinational logic 701 implements the three alternative 32-bit bitwise logic functions performed on B, C, and D during each of the four rounds. Instead of having three fully separate but alternative logic circuits, In all likelihood, some portion of the logic 701 is shared between outputs. Multiplexor 702 and 703 select the proper function for the given round RND[1:0].

Figure 8:
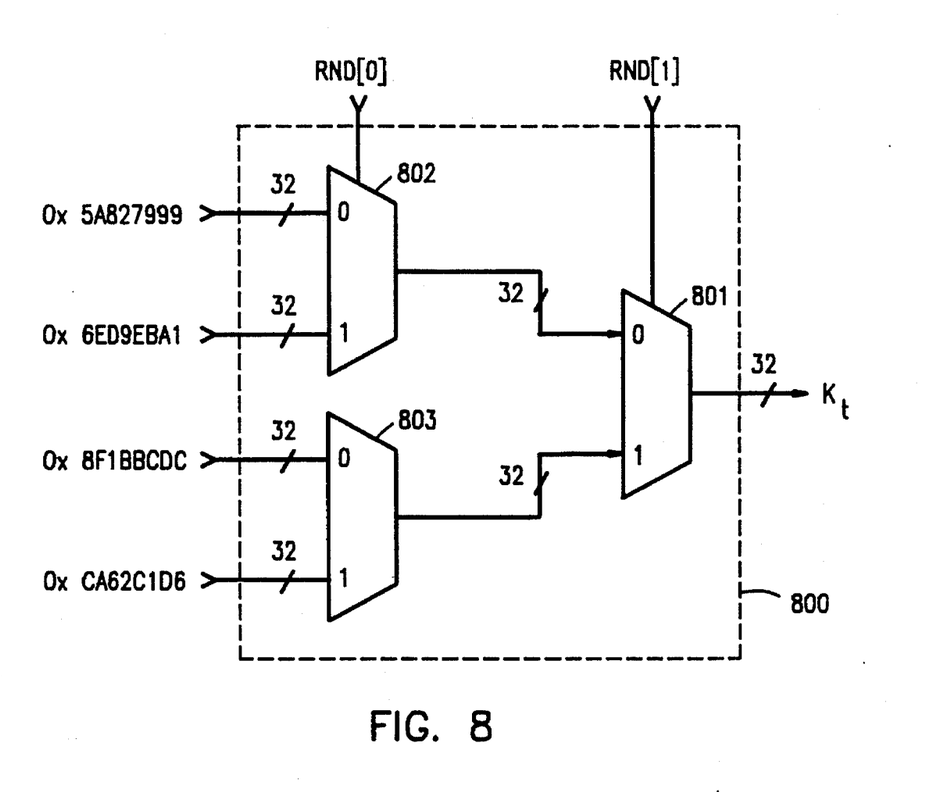
FIG. 8 illustrates one way to implement the $K_t$ values for the Secure Hash Algorithm implementation according to the present invention.

Similarly, the Kt generator 515 can be implemented as the circuit 800 illustrated in FIG. 8 in which the hardwired constant values for Kt are selected by the encoded representation of the round number RND[1:0].

The Wt generator 514 is the substantial circuitry shown in FIG. 6, which includes circuitry implementing a sixteen deep first in first out shift register 602. The sixteen location memory structure illustrated in FIG. 6 by the function of the shift register 602 and the multiplexor 603 can be implemented in alternative manners. The illustration shown in FIG. 6 is shown only to demonstrate the desired resultant logic and data flow.

| Clock | Action |
|---|---|
| 0 | E and f(t,B,C,D) are added together. The result is loaded in the accumulator. Accumulator = E + f(t,B,C,D) |
| 1 | Kt is added to the value in the accumulator. Accumulator = Kt + [E+f(t,B,C,D)] |
| 2 | S5(A) is added to the accumulator. Accumulator = (A <<< 5) + [Kt+E+f(t,B,C,D)] |
| 3 | Wt is added to the accumulator. Accumulator = Wt + [(A<<<5)+Kt+E+f(t,B,C,D)] |
| 4 | D→E<br>C→D<br>S30(B)→C<br>A→B<br>Accumulator→A. |

In the above table, the clock period four is shown to include the forward shifting of the A–E registers which occurs at the end of each hash operation. The fact that all of these assignments are shown to occur in clock period four is for ease of illustration only. FIG. 5 shows a single shift enable input shift_h to the shift registers A–E. When shift_h is high, all A through E values shift forward. In an actual implementation, shift_h can be replaced by five separate signals (shift_h0 through shift_h4, for example). Each separate signal can control one of the registers A through E. With this hardware structure and a proper controller, the assignments shown in period four above can be spread out over the cycles. For example in period 1, D could be assigned to E. In period 2, C could be assigned to D. In period 3, A could be assigned to B while S30(B) was assigned to C. And in period 4, the accumulator could be assigned to A. This is in fact how an actual implementation of the present invention functions.

After executing the 80 loops, ten additional clock cycles are required to update the message digest (H4=H4+E, H3=H3+D, H2=H2+C, H1=H1+B, H0=H0+A).

| Clock | Action |
|---|---|
| 0 | H4 and E are added together. The result is placed in the accumulator. H3→H4, H2→H3, H1→H2, H0→H1, D→E, C→D, B→C, and A→B. |
| 1 | The accumulator → H0 and A. |
| 2–9 | The actions taken in the first and second clock cycles are repeated four more times. |

The SHA Accelerator then returns to the idle state and clears its Busy status bit.

The SHA Accelerator 404 is subdivided into eight functional blocks:

Bus Interface Unit

State Machine/Controller

H0–H4 Registers

A–E Registers

W Generator

K Generator

Adder Accumulator f(t,B,C,D) Generator.

The Bus Interface Unit 901 is the interface between the module's internal functional blocks and the processor core bus 401, 902. The BIU decodes the address, latches data off the core bus 401, 902, and writes data onto the core bus. The BIU complies with the processor core bus specification. The SHA Accelerator supports 8-bit access to all of its control and status registers and 32-bit access to the data registers. The control and status registers reside in the BIU. The SHA Accelerator operates at zero wait states and supports pipelined accesses.

The State Machine/Controller 904 functional block contains all of the logic necessary to operate the SHA Accelerator except for the control logic located in the BIU 901. The control registers 903 are maintained adjacent to the State Machine Controller 904.

The H0–H4 Registers 502–506 are configured as a five deep, 32-bit wide first in first out buffer. There are used to store the H values of the SHA.

The A–E Registers 508–512 are configured as a five deep, 32-bit wide first in first out buffer. They are used to store the A–E values of the SHA. The connection between B and C contains two paths. The first and second paths implement B→C and S30(B)→C, respectively. The first path is used during initial loading of the H values and during the updating of the message digest at the end of processing the new message block. The second path is used during the 80 hash operations during processing each message block.

The W Generator 514 stores and generates the W values necessary for the SHA. The W values are generated (W16–W79) concurrently with the hashing of the message block (original W0–W15). During each of the loops, W[t+16] is generated. The FP_MODE control bit selects how the new W values are generated. W80–W95 are only used in Auto-Test mode.

FP180-1: W[t+16]=S1 (W[t+13] XOR W[t+8] XOR W[t+2] XOR W[t])

FP180: W[t+16]=W[t+13] XOR W[t+8] XOR W[t+2] XOR W[t]

| Clock | Action |
|---|---|
| 0 | Clear PXOR (Partial XOR) Read W[t + 2] Signal CLR_PXOR is asserted and the PXOR flip-flop 606 is cleared. SEL_SR_OUT, also generated by the state machine controller 904, selects W2 as the output of the multiplexor 603. |
| 1 | Load W[t + 2] into PXOR Read W[t] Since the contents of PXOR at the end of clock zero are 0, then zero XORed by 32-bit wide XOR gate 605 with W[t + 2] yields W[t + 2] which is latched in PXOR flip flop 606. The state machine 904 selects W0 out of the multiplexor 603. |
| 2 | Load W[t] into Wt Load (W[t + 2] XOR W[t]) into PXOR Read W[t + 8] W(t) is latched into register Wt by asserting LD_WT. The output of 605 is latched into PXOR 606. The multiplexor 603 selects W8. |
| 3 | Load (W[t + 2] XOR W[t] XOR W[t + 8]) into PXOR Read W[t + 13] The output of XOR gate 605 is latched into PXOR 606. The state machine 904 selects W13 for the output of multiplexor 603. |
| 4 | Write W[t + 16] over the original W[t] The output of XOR gate 605 is written into W(t + 15) (as t is incremented) because the state machine controller 904 asserts SHIFT_W, as all values in the array of flip-flops shifts forward one, while the previous W(0) is lost. Multiplexor 601 selects input 0 because LD_MB is deasserted since a new message block is not being written. FP_MODE controls multiplexor 608, which determines whether or not the resulting expansion value W(t + 16) is left shifted or not. |

The K Generator, shown in FIG. 8, contains the four K values for the SHA. They are hardwired, and the proper one is selected depending on the current round of the SHA.

For t=0 to 19, Kt=5A827999h.

For t=20 to 39, Kt=6ED9EBA1h.

For t=40 to 59, Kt=8F1BBCDCh.

For t=60 to 79, Kt=CA62C1D6h.

The Adder Accumulator can functionally be divided into an adder and an accumulator. The adder 522 adds two 32-bit operands. The adder 522 does not require a carry in or carry out bit. The first operand of the adder 522, Add_A, is fed by H4 f(t,B,C,D), or the accumulator's output. The second operand of the adder, Add_B, is fed by Kt, S5(A), Wt, or E. The correct signals to be fed into the adder are controlled by the State Machine/Controller 904 shown in FIG. 9. The 32-bit accumulator register 523 holds the result of the addition.

The f(t,B,C,D) Generator, shown in FIG. 7, is pure combinational logic used to implement three Boolean functions used by the SHA. The three functions are listed below.

For t=0 to 19, f(t,B,C,D)=(B&C)|(~B&D).

For t=20 to 39, f(t,B,C,D)=B XOR C XOR D.

For t=40 to 59, f(t,B,C,D)=(B&C)|(B&D)|(C&D).

For t=60 to 79, f(t,B,C,D)=B XOR C XOR D.

where &=bitwise AND, |=bitwise OR, ~=bitwise complement

Register Definition and Register Addresses

| Reg. | Address [9:2] | effective | R/W | Width (bits) |
|---|---|---|---|---|
| Control | 0XXXX000b | 000h | w | 8 |
| Status | 0XXXX001b | 004h | r | 8 |
| ATCNT | 0XXXX011b | 00Ch | r/w | 8 |
| W_data | 1XXXX000b | 200h | w | 32 |
| H_data | 1XXXX001b | 204h | r/w | 32 |

Control Register Description

| D7 | D6 | D5 | D4 | D3 | D2 | D1 | D0 | |
|---|---|---|---|---|---|---|---|---|
| Resv | Resv | FPC | Resv | ATst | Resv | Resv | Rst | |
| N/A | N/A | 0 | N/A | 0 | N/A | N/A | 0 | reset condition |

Bits 7, 6: Resv—Reserved.

Bit 5: FPC—Setting this bit implements the SHA as specified by FIPS PUB 180, 1993 May 11. Clearing this bit implements the SHA as specified by FIPS PUB 180-1, 1994 May 31. During Auto Test Mode according to the present invention, (when ATst is set), FPC equals the least significant bit of ATCNT and writing to this bit has no affect. FPC should only be changed when the Status bit Busy is not set. The value of FPC controls the value of the FP_MODE signal in FIG. 6.

Bit 4: Resv—Reserved.

Bit 3: ATst—Auto-Test. Setting this bit places the SHA Accelerator in Auto-Test Mode according to the present invention. Clearing this bit takes the SHA Accelerator out of Auto-Test Mode. ATst can only be changed when the Status bit Busy is not set.

Bit 2: Resv—Reserved.

Bit 1: Resv—Reserved.

Bit 0: Rst—Setting the Rst bit resets the SHA Accelerator. Resetting the bit has no affect. This bit is self-clearing. Setting this bit corrupts the current hash.

Status Register Description

| D7 | D6 | D5 | D4 | D3 | D2 | D1 | D0 | |
|---|---|---|---|---|---|---|---|---|
| Resv | Resv | FPM | Resv | ATM | Resv | Resv | Busy | |
| N/A | N/A | 0 | N/A | 0 | 0 | N/A | 0 | reset condition |

Bits 7–6: Resv—Reserved always read 0.

Bit 5: FPM—FP180 Mode. A zero indicates that the SHA Accelerator is in the FP180-1 mode. A one indicates that the SHA Accelerator is in the FP180 mode. FPM indicates the last value of FP_MODE in FIG. 6.

Bit 4: Resv—Reserved always read 0.

Bit 3: ATM—Auto-Test Mode. A zero indicates that the SHA Accelerator is not in Auto-Test mode. A one indicates that the SHA Accelerator is in Auto-Test mode according to the present invention.

Bit 2: Resv—Reserved.

Bit 1: Resv—Reserved. Does not always read 0.

Bit 0: Busy—A zero indicates that the SHA Accelerator is not busy. H_data may be read or written. A one indicates that the SHA Accelerator is busy performing a hash. H_data may not be read or written.

ATCNT Register Description

| D7 | D6 | D5 | D4 | D3 | D2 | D1 | D0 | |
|---|---|---|---|---|---|---|---|---|
| Resv | Resv | Resv | ATCNT4 | ATCNT3 | ATCNT2 | ATCNT1 | ATCNT0 | |
| N/A | N/A | N/A | 0 | 0 | 0 | 0 | 0 | reset condition |

Bits 7–5: Resv—Reserved always read 0.

Bits 4–0: ATCNT—The Auto-Test Counter is a 5-bit programmable down counter that is used while in Auto-Test Mode. The value programmed into the counter is the number of hash cycles performed. The maximum number of cycles is 32 when ATCNT is programmed with 0x1Fh. The minimum number of cycles is 1 when ATCNT is programmed with 0x00h. As the SHA Accelerator runs in Auto-Test Mode, the ATCNT is decremented by one at the end of each hash cycle, except for the last cycle (ATCNT=0x00h). While the Status bit ATM is set, the Status bit FP180 mode equals the least significant bit of ATCNT.

ATCNT may be read whenever Busy is not set. If Busy is set, ATCNT may not be stable. To ensure a valid read is performed, the register must be read twice, and the values compared. If the two reads produce the same value, the reads are valid. If the two values are not the same repeat the above procedure.

W_data Register Definition

| D31 | D0 |
|---|---|
| W_data[31:0] | |
| N/A | reset condition |

W_data is a 32-bit path for loading the W values into the shift register 602 inside the SHA Accelerator through multiplexor 601. The state machine controller 904 and bus interface unit 901 decodes a write to the W_data register from a bus master. The bus master must load the W values in the following order: W0, W1, W2..., W14, W15. Once W15 is loaded, the SHA Accelerator sets Busy. W15 must be loaded last.

H_data Register Definition

| D31 | D0 |
|---|---|
| H_data[31:0] | |
| N/A | reset condition |

H_data is a 32-bit path for loading and unloading H values. The bus master must load the H values in the following order: H4, H3, H2, H1, H0. The H values are read out in the following order: H4, H3, H2, H1, H0.

The following description is a method for Programming and using the SHA Accelerator.

1. Read the status register to check the Busy status bit.
2. If Busy status bit is set, go back to #1. If the bit is cleared, continue.
3. Clear the FP180 control bit to place the SHA Accelerator in the FP180-1 mode.
4. Write H4, H3, H2, H11, and then H0 to the H_data register. The H_data register must be loaded in this order.

5. Write W0, W1, . . . , W14, then W15 to the W_data register.
6. Hashing begins as soon as W15 is written. The SHA Accelerator sets the Busy status bit.
7. Once the Busy bit is cleared, the next W0–W15 may be loaded. The polling of Busy and the loading of the W values occurs after Busy is cleared.
8. Repeat steps 6 and 7 for as many message blocks as desired.
10. Once the Busy status bit is cleared and the last message block of W words has been hashed, the message digest may be read out of MD 513 in FIG. 5 through the bus interface unit 901 in FIG. 9. The Message Digest MD is read as H values are read out of the H_data register in the following order: H4, H3, H2, H1, and H0.

Figure 10:
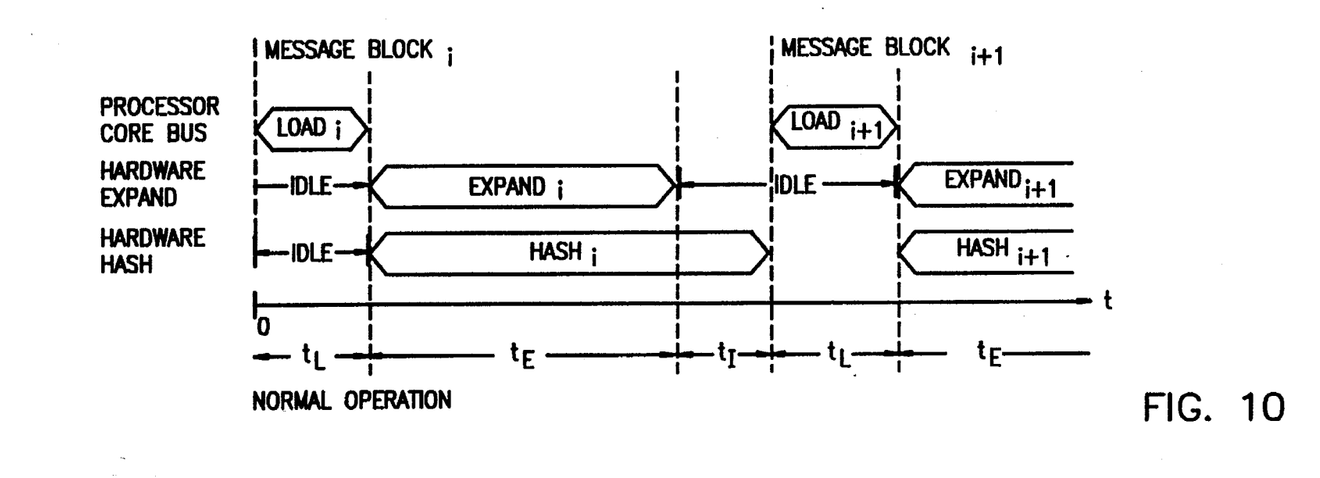
FIG. 10 is a timing and resource utilization and occupancy diagram of the major circuits of the Secure Hash Algorithm implementation according to the present invention during normal message block processing.

FIG. 10 illustrates the occupancy and timing of hardware resources during cycles 6 and 7 above, in which a new message block is loaded through the processor core bus 401,902 through the bus interface 901 and into shift register 602 at time t=0. After the last message 32-bit sub-block M15 has been input in shift register 602, at time t=tL, the ith message block has been fully loaded, and the Wt generator 514, 600 begins expansion of data at the rate of one new future Wt value (Wt+16) per operation cycle t. At time tL, the hash hardware 500, 404 begins hashing the block at one operation per cycle t. Thus the shift register 602 maintains the current and next 15 W_data values. The length of tL is 16 cycles. The expansion hardware (605, 606, 607, 608), 514 is idle at time t= tL+tE, which is 16 cycles prior to the end of the hash round of 80 cycles. At time tL+tE+tI, the hash hardware 500, 404 is idle. During this time, the message next block i+1 is loaded through the bus interface 901 on the processor core bus 401,902 into the shift register 602 while the hardware expansion (605, 606, 607, 608), 514 and hash function 500, 404 are idle.

If a production test is performed by feeding a predetermined set of inputs as in related solutions, then the processor core bus 401, 902 is occupied and testing of other modules must wait until the hash function test has finished. Furthermore, the message block processing time is tL+tE+tI; during the tL, the hash function hardware 500 is undesirably idle.

Figure 11:
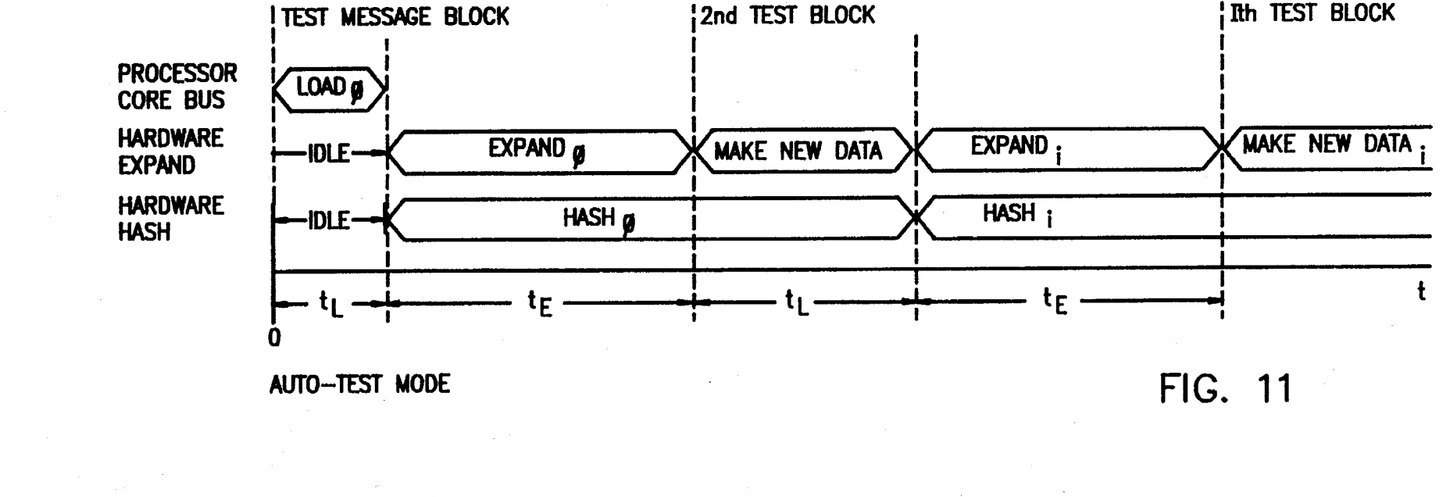
FIG. 11 is a timing and resource utilization and occupancy diagram of the major circuits of the Secure Hash Algorithm implementation according to the present invention during an test involving automatic data generation according to the present invention.

FIG. 11 is a timing diagram illustrating the occupancy and timing of hardware resources during two Auto Test cycles according to the present invention. At time t=0, an initial test message block is written across the processor core bus 401, 902 into the shift register 602. At the time t=tL, the expansion hardware (605, 606, 607, 608) and the hash hardware 500 begin processing. However, according to the present invention, at time t=tL+tE, the expansion hardware (605, 606, 607, 608) finishes generating the W79 as required by the Secure Hash Algorithm, and automatically begins generating the second test block of data during the last 16 cycles of the processing of the previous message block. The use of the expansion hardware (605, 606, 607, 608) to produce the next test message block eliminates the need for the next message block to be loaded through the processor core bus 401, 902. In this manner, the test coverage can be made large by running T test message blocks MB(1) to MB(T) to achieve $1-(1-P)^T$ fault coverage. However, only one message block MB(1) is required as input. The remaining test message blocks MD(2) to MD(T) are generated from the first message block MB(1) according to the following expansion function, in which Mi represents the ith 32-bit message word.

M(t-64)=Wt-3 XOR Wt-8 XOR Wt-14 XOR Wt-16 for t=64 to 79.

At time t=64 (t=tL+tE in FIG. 11), the expansion hardware (605, 606, 607, 608) begins computing the first message sub block M0 of the next test message block according to the above equation based upon the last sixteen 32-bit current test message sub blocks (W64–W79) still in the shift register 602. Because the writing of the next message block occurs through multiplexor 601 rather than through the processor core bus 401,902, other tests can be performed in parallel with the Auto Test according to the present invention.

According to the present invention, the SHA Accelerator provides a special mode for test and verification. The Auto-Test Mode allows the SHA Accelerator to cycle through the SHA a programmable number of times without external assistance after an initialization process.

Auto-Test Mode allows the SHA Accelerator to cycle through the SHA from 1 to 32 times. In the presently preferred embodiment, the least significant bit of the ATCNT register determines if the current hash cycle is run in the FP180 or FP180-1 Mode. After the loading of the initial 16 W values into the W_data register, the SHA Accelerator is Busy until the completion of all of the hash cycles as determined by the value programmed into ATCNT, Rst is set, or a system reset occurs. ATCNT is decremented by one at the end of each hash cycle except when ATCNT equals zero.

Figure 3:
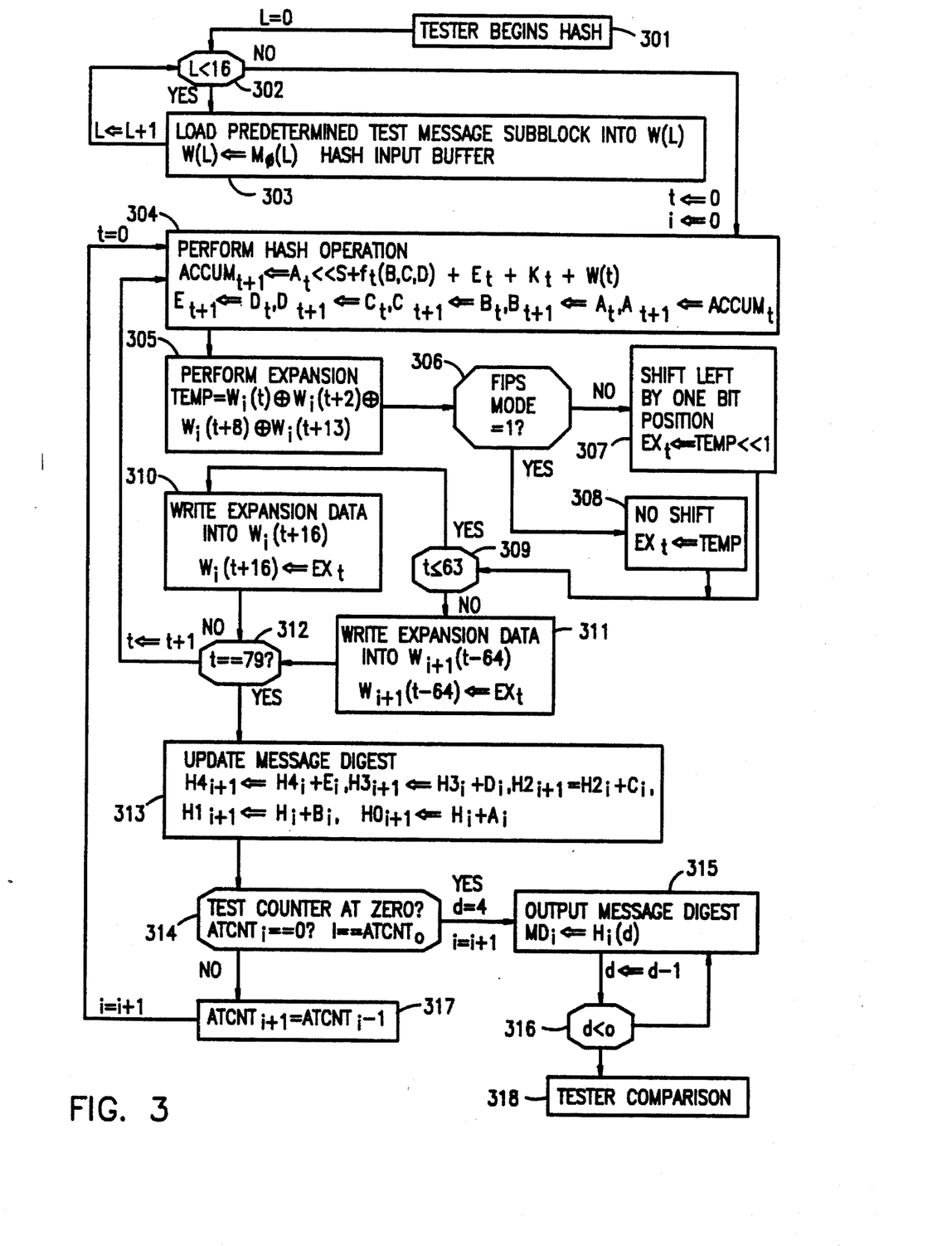
FIG. 3 illustrates a method for performing a test of a hash function using automatic data generation according to the present invention.

W values are generated in the following manner in Auto-Test Mode:

The first W0–W15 are loaded by the user. During the first hash cycle, W16–W79 are produced as usual during rounds 0–63 of the hash cycle. The W values are generated using either the FP180 or FP180-1 method depending on the least significant bit of ATCNT. During rounds 64–78 of the hash cycle, W80–W94 are generated in the same manner as the other W values. For the second hash cycle, W80–W94 of the first cycle become W0–W14 for the second cycle, and W79 of the first cycle becomes W15 of the second cycle. (In an alternate embodiment of the present invention, W95 is computed according to the expansion function defined above during first cycle and becomes W15 of the next cycle.) This continues through all of the hash cycles. The procedure for using this mode is outlined below::

1. Set the Rst bit in the Control register.
2. Set the ATst bit in the Control register.
3. When ATst is set, the FP180 Mode Status bit is equal to the least significant bit of ATCNT.
4. Read the Status register to ensure ATM set.
5. Program a value N (between 0 and 31) into ATCNT.
6. Read ATCNT to ensure that it is equal to N.
7. Load five H values into the H_data register.
8. Load 16 W values into the W_data register.
9. Read the Status register to ensure ATM and Busy are set and FP180 equals the least significant bit of ATCNT.
10. The SHA Accelerator should run for approximately (410*(N+1)) clocks.
11. When the Busy Status bit is cleared, the Auto-test is complete.
12. Read the message digest out of the H_data registers. The correct way to use the Auto-test Mode according to the present invention is to perform a known answer test. FIG. 3 illustrates a method for performing known answer test. The tester, which may be a test program in a production testing environment as depicted in FIG. 1, or a self-test program within the ROM 403, or a test program in external memory 406 begins the hash at step 301. A test message word counter I starts at zero.

Test 302 determines whether the sixteenth and final 32-bit test message sub block M0(15) has been input yet. If test 302 results in a yes answer, step 303 loads the Ith 32-bit message sub block into a first in first out hash input buffer (such as the shift register 602). After the steps 302 and 303 have been repeated sixteen times in the preferred embodiment of the Secure Hash Algorithm, test 302 branches at time t=0 and test message block i=0 to step 304. At step 304, the hash function (such as the Secure Hash Algorithm), performs its basic hash operation. At step 305, the hardware expansion unit performs its expansion function, which in the preferred embodiment of the present invention is the one used in the Secure Hash Algorithm. Test 306 checks the FIPS PUB 180 Mode, which in the preferred embodiment of the Auto test mode according to the present invention is the least significant bit of the test counter ATCNT. If FIPS MODE is cleared, then the result of the expansion is left rotated one bit position, and if it is set, then result of the expansion is not left rotated at step 308. Test 309 determines whether or not the operation number t is less than 64, in which case expansion W data for the current message block cycle must be generated by the W data expansion hardware and used in the current message block hash at step 310. If test 309 determines that it is past step 63, then the W data expansion hardware generates an additional sixteen W values for the next test message block and writes that into the input buffer at step 311. Test 312 either iterates the hash operation 304 as t is incremented, or if the last hash operation has been performed (t=79), updates the message digest at step 313. Then the test counter ATCNT is compared to zero at test 314. If ATCNT is not zero, ATCNT is decremented at step 317, and the hash operation is repeated for another 512-bit test message block. In the preferred embodiment, the FIPS MODE (tested at step 306 to determine which of steps 307 and 308 to perform) is the opposite during the next cycle because the least significant bit of ATCNT inverts each cycle relative to its previous cycle. When test 314 determines that the test counter ATCNT has reached zero, step 315 outputs the message digest as a series of five 32-bit words to the tester through the bus interface 901. Then the test program compares the product computed message digest to a precomputed known correct answer. If the output hash module computed message digest and the precomputed known correct answer are equal, then the product passes production testing. If equality is not detected by the tester, the hash function 404 has failed its test. The ATCNT is made large to achieve high fault coverage with a fixed size word.

The SHA Accelerator benefits from concurrent assistance from the processor. The processor is responsible for message padding, loading initialization (H) values, and data loading/ unloading. The firmware must poll the Busy status bit, then load the 16 new W values within 100 cycles to achieve this performance. Busy is cleared with the expansion hardware no longer writes into the shift register 602.

While the present invention has been disclosed with particular reference to its preferred embodiment, that embodiment is presented by way of example, not by way of limitation. Those of ordinary skill in the art would be enabled by this disclosure to add to or modify the embodiment of the present invention in various ways as needed and still be within the scope and spirit of the present invention as recited in the appended claims. Accordingly, various changes and modifications which are obvious to a person skilled in the art to which the invention pertains are deemed to lie within the spirit and scope of the invention as claimed.

What is claimed is:

1. A method of testing a hash circuit taking T M-bit message blocks serially as input and producing an H-bit message digest as output, the hash circuit including a data expansion circuit taking the M-bit message block as input and producing an E-bit expanded message block as output, the method comprising the steps of:

(a) loading a predetermined input M-bit test message block MB(1) into the hash circuit;

for each i between 1 and T, inclusive;

(b) performing an expansion by using the data expansion circuit taking an ith M-bit test message block MB (i) as input and producing an ith E-bit expanded test message block as output;

(c) performing a hash by using the hash circuit taking the ith E-bit expanded test message block EMB (i) as input and producing an ith H-bit message digest MD(i) as output; and (d) using the data expansion circuit taking a portion of the ith E-bit expanded test message block as input to generate: an i+1th M-bit test message block MB (i+1) as output; and (e) outputting, by the hash circuit, the Tth H-bit message digest.

2. A method of testing a hash circuit as in claim 1, wherein M=512, E=2056, and H=160.

3. A method of testing a hash circuit as in claim 2, wherein the hash includes a plurality of hash operations, and wherein the data expansion circuit produces a W-bit sub block per hash operation.

4. A method of testing a hash circuit as in claim 3, wherein the data expansion circuit includes bitwise exclusive ORing of two or more W-bit sub blocks to produce a future W-bit sub block.

5. A method of testing a hash circuit as in claim 4, wherein W=32 and the hash circuit operates on 32-bit sub-blocks;

wherein each subsequent test message block MB(i+1) includes sixteen sub-blocks MB(i+1){0:15};

wherein the expanded message block EMB(i) includes eighty 32-bit expanded sub-blocks EMB(i){0:79};

wherein the data expansion circuit performs step (d) by performing the following, for t=64 through 79, performing a bitwise logical expansion operation to produce the subsequent message block t–64th sub block MB(i+1){t–64} by bitwise exclusive ORing four previously computed sub blocks.

6. A method of testing a hash circuit as in claim 5, wherein the four previously computed sub blocks are EMB(i){t}, EMB(i){t+2}, for t<78, otherwise MB(i+1){t–78}, EMB(i){t+8}, for t<72, otherwise MB(i+1){t–72}, and EMB(i){t+13}, for t<67, otherwise MB(i+1){t–67}.

7. A method of testing a hash circuit as in claim 4, wherein W=32 and the hash operation operates on 32-bit sub-blocks;

wherein each subsequent test message block MB(i+1) includes sixteen sub blocks MB(i+1){0:15};

wherein the expanded message block EMB (i) includes eighty 32-bit expansion sub blocks EMB(i){0:79};

wherein the data expansion circuit performs step (d) by performing the following:

for t=64 through 78,
  performing a bitwise logical expansion operation to produce the subsequent message block t−64th sub block MB(i+i){t−64} by bitwise exclusive ORing four previously computed sub blocks;

for t=79,
  assigning the subsequent message block t−64th sub block with the last message block sub block EMB(i){t}.

8. A method of testing a hash circuit as in claim 7,
wherein the four previously computed sub blocks are
  EMB(i){t},
  EMB(i){t+2}, for t<78, otherwise MB(i+1){t−78},
  EMB(i){t+8}, for t<72, otherwise MB(i+1){t−78}, and
  EMB(i){t+13}, for t<67, otherwise MB(i+1){t−67}.

9. A method of testing a hash circuit as in claim 8, wherein the next message block sub block MB(i+1){t−64} is left rotated by one bit position when a mode control bit is deasserted.

10. A method of testing a hash circuit as in claim 9, wherein the hash circuit implements a Secure Hash Algorithm.

11. A method of testing a hash circuit as in claim 10,
wherein the least significant bit of a test message block counter is written into the mode control bit, and
wherein the test message block counter is decremented each test message block i.

12. A method of testing a hash circuit as in claim 8, wherein the data expansion circuit comprises:
  a K-deep W-bit wide first in first out register file having a load W_data input, a selected register output, and a register select input;
  an W-bit wide bitwise XOR gate having first and second XOR inputs and producing an XOR output; and
  a W-bit wide flip-flop for storing intermediate expansion data having a flip-flop input and a flip-flop output;
  wherein the XOR output is connected to the flip-flop input, and the flip-flop output is connected to the first XOR input, and the second XOR input is connected to the selected register output.

13. A method of testing a hash circuit as in claim 12, wherein the data expansion circuit further comprises:
  a left-shift multiplexor for selectively shifting the XOR output one bit position having a straight-through input and a left-shifted input, and producing an expansion sub block output.

14. A method of testing a hash circuit as in claim 13, wherein the data expansion, circuit further comprises:
  an input multiplexor for selecting an externally supplied input or the expansion sub block output as inputs and producing the load W_data input.

15. A method of testing a hash circuit as in claim 12, wherein steps (b) and (d) are comprised of the steps of:
  clearing the flip flop;
  selecting a first register through the register select input of the K-deep register file and loading the XOR output into the flip flop;
  selecting a second register through the register select input of the K-deep register file and loading the XOR output into the flip flop;
  selecting a third register through the register select input of the K-deep register file and loading the XOR output into the flip flop; and
  selecting a fourth register through the register select input of the K-deep register file and loading the XOR output into the last location of the K-deep register file.

16. A method of testing a hash circuit as in claim 1, further comprising the step of:
  comparing the Tth H-bit message digest to a known correct answer to determine a test result.

17. A method of testing a hash circuit as in claim 1, further comprising, prior to step (a), the steps of:
  setting an auto-test control bit;
  loading T-1 into a test message block counter; and
  loading five initialization constants into an H register.

18. A method of testing a hash circuit as in claim 17, wherein step (a) includes the step of:
  for j=0 to 15;
  loading a jth 32-bit test message block sub-block $M_j(1)$ into a hash circuit data storage unit.

19. A method of testing a hash circuit as in claim 18, wherein the hash circuit data storage unit is a sixteen-deep 32-bit wide first-in-first-out buffer.

20. A method of testing a hash circuit as in claim 19, wherein the hash circuit data storage unit is used to store a current W value and 15 future W values.

21. A method of testing a hash circuit as in claim 20, wherein step (c) includes the steps of:
  reading the current W value and one or more future W values from the hash circuit data storage unit;
  performing a bitwise logical XOR on the current W value and the one or more future W values to produce an expansion W value;
  writing the expansion W value into the hash circuit data storage unit.

* * * * *

UNITED STATES PATENT AND TRADEMARK OFFICE
CERTIFICATE OF CORRECTION

PATENT NO. : 5,623,545
DATED : April 22, 1997
INVENTOR(S) : MATTHEW H. CHILDS ET AL.

It is certified that error appears in the above-indentified patent and that said Letters Patent is hereby corrected as shown below:

In Col. 16, line 24, delete "generate:" and replace with --generate--.

In Col. 17, line 52, delete "expansion," and replace with --expansion--.

Signed and Sealed this

Eighth Day of July, 1997

Attest:

Attesting Officer

BRUCE LEHMAN

Commissioner of Patents and Trademarks